US007896042B2

(12) United States Patent
Kozina et al.

(10) Patent No.: US 7,896,042 B2
(45) Date of Patent: Mar. 1, 2011

(54) HINGE AND STRIKE PLATE MORTISE KIT

(75) Inventors: Damian A. Kozina, Chicago, IL (US); Edward D. Adkins, Machesney Park, IL (US)

(73) Assignee: Nomis LLC, Hampshire, IL (US)

( * ) Notice: Subject to any disclaimer, the term of this patent is extended or adjusted under 35 U.S.C. 154(b) by 0 days.

(21) Appl. No.: 12/821,295

(22) Filed: Jun. 23, 2010

(65) Prior Publication Data

US 2010/0314003 A1 Dec. 16, 2010

Related U.S. Application Data

(63) Continuation of application No. 11/956,536, filed on Dec. 14, 2007, now Pat. No. 7,766,059.

(51) Int. Cl.
*B27M 3/00* (2006.01)
*G01B 3/14* (2006.01)

(52) U.S. Cl. ........................................ 144/372; 33/562

(58) Field of Classification Search .............. 144/144.1, 144/144.51, 144.52, 145.1, 329, 358, 359, 144/360, 372; 409/125, 130; 33/562, 566
See application file for complete search history.

(56) References Cited

U.S. PATENT DOCUMENTS

| | | | |
|---|---|---|---|
| 3,519,043 | A | 7/1970 | Guill |
| 3,789,892 | A | 2/1974 | Converse et al. |
| 4,274,459 | A | 6/1981 | Galajda |
| 5,042,543 | A | 8/1991 | Carey |
| D395,246 | S | 6/1998 | Carey |
| 5,862,848 | A | 1/1999 | Beall |
| 6,926,477 | B2 | 8/2005 | Allemann et al. |
| 7,766,059 | B2 | 8/2010 | Kozina et al. |
| 2006/0272166 | A1 | 12/2006 | Adkins et al. |

(Continued)

FOREIGN PATENT DOCUMENTS

| | | |
|---|---|---|
| EP | 0 511 898 A2 | 11/1992 |

(Continued)

OTHER PUBLICATIONS

Lee Valley, A. Hinge Mate B. Hinge Mortising System, page from catalog, date unknown, 1 page; Known to Applicant on or before Dec. 13, 2007.

(Continued)

*Primary Examiner*—Shelley Self
(74) *Attorney, Agent, or Firm*—Reinhart Boerner Van Deuren P.C.

(57) ABSTRACT

A kit for forming mortises in door edges and door frames for flush-mounting door hinges, strike plates and latch plates is provided. The kit generally includes a template holder and a plurality of templates mountable to the template holder. The templates provide guides for various size hinges, strike plates or latch plates. The template holder includes an adjustment mechanism for easily adapting the template holder from doors having a first thickness to doors having a second thickness. The adjustment mechanisms include a rotatable cam and knob. The kit may optionally include an alignment schedule providing distances for locating the templates relative to a door end or a frame. Further, the templates may include tab engagement slots for engaging a tape measure.

17 Claims, 5 Drawing Sheets

U.S. PATENT DOCUMENTS

2009/0155009 A1 * 6/2009 Kozina et al. ............. 408/72 R

FOREIGN PATENT DOCUMENTS

GB 2 285 410 A 7/1995

OTHER PUBLICATIONS

Woodcraft, Router Accessories, page from catalog, date unknown, 1 page, p. 34; Known to Applicant on or before Dec. 13, 2007.
Trend Machinery, Routing Jigs & Accessories, pages from catalog, date unknown, 2 pages; Known to Applicant on or before Dec. 13, 2007.
Woodhaven, Unique Tools, page from catalog, date unknown, 1 page, p. 24; Known to Applicant on or before Dec. 13, 2007.
Norfield, Door & Jamb Tools, page from catalog, date unknown, 1 page, p. 10; Known to Applicant on or before Dec. 13, 2007.
Milescraft, HingeMortise Guide Set, product manual, date unknown, 2 pages, pp. 1 and 2; Known to Applicant on or before Dec. 13, 2007.
Sears Craftsman, Butt Hinge Template Model 2564, product manual, date unknown, 4 pages; Known to Applicant on or before Dec. 13, 2007.
Norfield, Door Tools for Door Pros, 2007 Winter Catalog, 2007, 32 pages.
Porter Cable, Hinge Butt Templet 59380 59381, Parts List, 1999, 1 page, Parts List No. 692548-996.
McFeelys, HingeMate for Woodworkers-from McFeely's, website, date last visited Mar. 22, 2005, 1 page, http://www.mcfeelys.com/product.asp?ProductID=hm-1100w.
Toolfetch, Door Hanging Tools: Bosch 83003 Door & Jamb Hinge Templet Kit, website, date last visited Mar. 22, 2005, 1 page, http://www.toolfetch.com/tools//flypage_masonry2.html?mv_arg=83003.
Toolfetch, Door Hanging Tools: Bosch 83038 Deluxe Door and Jamb Hinge Templet Kit, website, date last visited Mar. 22, 2005, 2 pages, http://www.toolfetch.com/tools//flypage_masonry2.html?id=d3Es7s3w&mx_arg=83038.
The Beall Tool Company,The Beall Hinge Wizard, website, date last visited Mar. 22, 2005, 2 pages, http://www.bealltool.com/hingewiz.htm.
Porter-Cable 59370 Door Hinge Template-JEWISHBOOKMALL.COM Info and Reviews, Porter-Cable 59370 Door Hinge Template, website, date last visited Mar. 22, 2005, 3 pages, http://www.jewishbookmall.com/shop/asinsearch_B00004T130.html.
Porter-Cable 59375 Strike and Latch Template-JEWISHBOOKMALL.COM Info and Reviews, Porter-Cable 59375 Strike and Latch Template, website, date last visited Mar. 22, 2005, 2 pages, http://www.jewishbookmall.com/shop/asinsearch_B00004T13P.html.
ROCKLER.COM, Jigs and Rockier JIG IT'S, website, date last visited Mar. 22, 2005, 5 pages, http://www.rockler.com/findit.cfm?cookietest=1&page=2290&sid=AF657.

* cited by examiner

HINGE AND STRIKE PLATE MORTISE KIT

CROSS-REFERENCE TO RELATED PATENT APPLICATIONS

This patent application is a continuation of U.S. patent application Ser. No. 11/956,536, filed Dec. 14, 2007, now U.S. Pat. No. 7,766,059, the entire teachings and disclosure of which are incorporated herein by reference thereto.

FIELD OF THE INVENTION

This invention generally relates to routing mortises for mounting hinges and strike plates to door edges, and more particularly to tools and kits for assisting in routing mortises for mounting hinges and strike plates to door edges.

BACKGROUND OF THE INVENTION

To improve the functionality and aesthetic appearance of door hinges and strike plates, do-it-yourself woodworkers (DIYs) typically recess the hinge or strike plate in a side of the door so that the hinge or strike is flush with the side of the door (also referred to as "flush mounted"). To flush mount the hinge or strike plate, a mortise is formed at the desired location along the side of the door. A router is one efficient and timely way to form the mortise.

DIYs will typically use a guide or template to guide the router as the mortise is formed. The template is nailed to the door in the appropriate location to form the mortise. However, as door thicknesses and heights vary, the orientation of the template relative to one door may be different with regard to a second door, such as a door having a larger thickness. Several representative templates for forming these mortises include the "Strike & Latch Template" having model number 59375 and "Door Hinge Template" having model number 59375 of Delta Porter-Cable, headquartered in Jackson, Tenn. These templates include removable locating pins that can be used to adjust the alignment of the templates relative to the thickness of the door. The pins extend through apertures in the template. The template includes numerous apertures that are offset from one another such that one aperture is used for a door of a first thickness, such as two inches, while a second aperture is used for a door of a second thickness, such as 2.25 inches.

The present invention relates to improvements in such templates for forming the mortises for locating and flush mounting door hinges and strike plates.

BRIEF SUMMARY OF THE INVENTION

The present invention has several aspects that may be claimed and stand as patentable independently and individually or in combination with other aspects, including but not limited to the following.

In one aspect, the invention provides for easy configuration between being useable with a door of a first thickness to a door of a second thickness. In accordance with this aspect, an embodiment of the present invention may comprise a template holder, a plurality of templates, and a pair of cams. The template holder includes a frame and two offsetting legs on opposite ends of the frame. The frame includes a mounting aperture interposed between the offsetting legs. The mounting aperture extending generally parallel to a direction of offset provided by the offsetting legs. Each leg terminates in a foot portion that includes at least one attachment aperture extending generally parallel to the mounting aperture. Each template includes a top plate including a mounting flange extending from one side of the top plate. The mounting flange is configured to snap-fit in the mounting aperture and secure the template to the frame. Each template further includes a template aperture passing therethrough. The cams are substantially identical. One cam is rotatably mounted to each foot about an axis of rotation extending generally parallel to the direction of offset provided by the offsetting legs. Each cam defines an outer periphery in a plane generally perpendicular to the axis of rotation having varying radii angularly about the axis of rotation.

In another aspect, the invention provides a template kit that includes templates that can individually be used to form different shaped mortises. In practicing this aspect, embodiments of the invention include a template holder and plurality of reversible templates. The template holder includes a frame and two offsetting legs on opposite ends of the frame. The frame includes a mounting aperture interposed between the offsetting legs. The mounting aperture extends generally parallel to a direction of offset provided by the offsetting legs. Each leg terminates in a foot portion that includes at least one mounting aperture extending generally parallel to the mounting aperture. Each template includes a top plate and a mounting flange extending from one side of the top plate. The mounting flange is snap-fit engageable in the mounting aperture to secure the template to the frame. Each template further includes a template aperture passing therethrough. At least one template aperture of the plurality of templates including a template aperture that is rotatable relative to the mounting apertures to provide a different mortise pattern.

In yet another aspect, the invention provides a template kit that includes templates that are engageable by a tape measure for easy and accurate measurement of the location and placement of the template for forming mortises in a door edge. In embodiments according to this aspect, the template kit includes a template holder and a plurality of templates. The template holder includes a frame and two offsetting legs on opposite ends of the frame. The frame includes a mounting aperture interposed between the offsetting legs. The mounting aperture extends generally parallel to a direction of offset provided by the offsetting legs. Each leg terminates in a foot portion that includes at least one mounting aperture extending generally parallel to the mounting aperture. The plurality of templates are mountable within the mounting aperture. The templates include a top plate which defines a template aperture extending therethrough. Each top plate further includes a pair of tape measure tab engaging slots on opposed sides of the template aperture.

Other embodiments of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
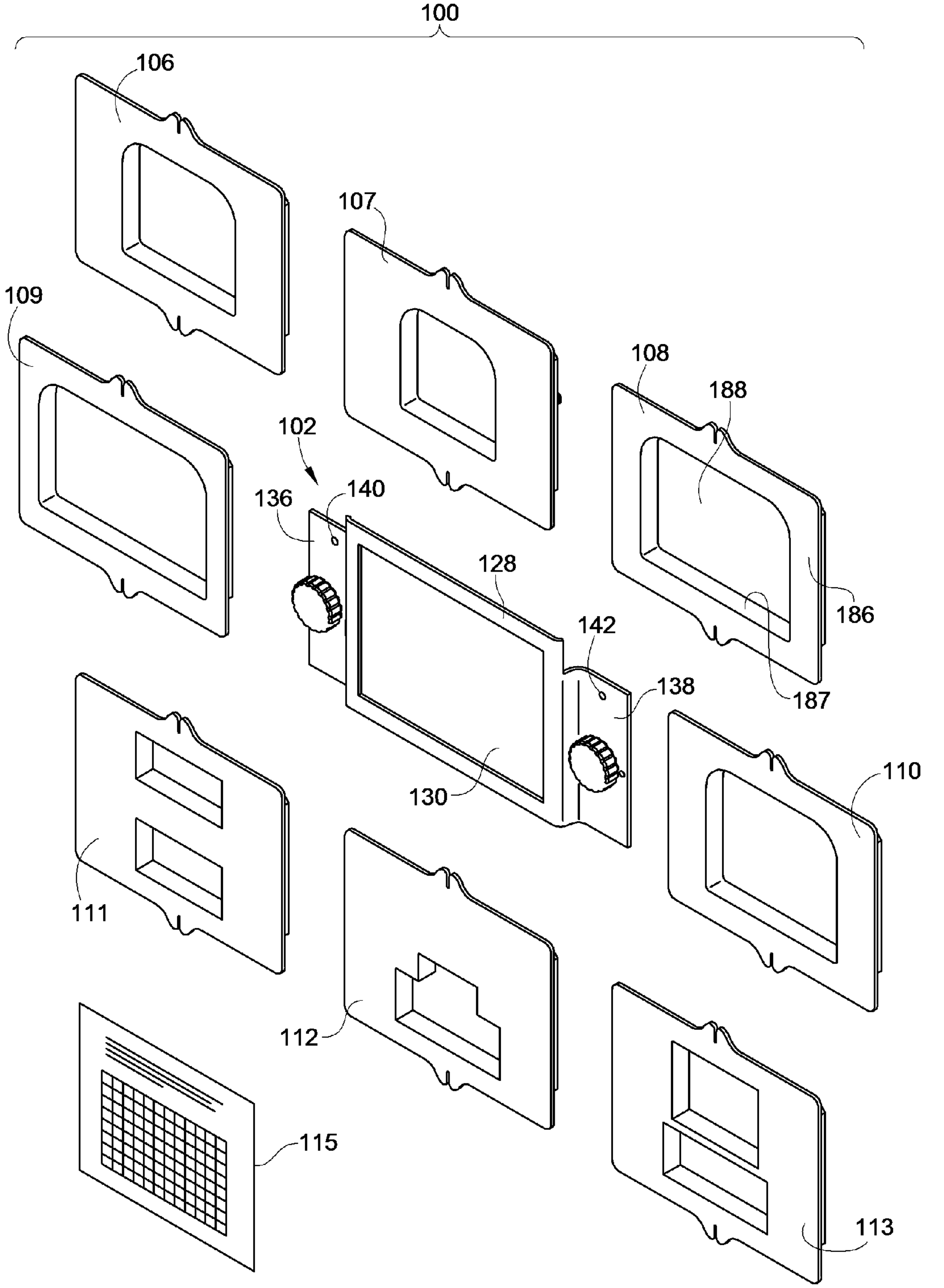
FIG. 1 is a perspective illustration of an exemplary embodiment of a mortise template kit in accordance with the teachings of the present invention.

FIG. 1 illustrates a first embodiment of a mortise template kit 100 in accordance with the present invention. A mortise template kit may also be referred to herein as “the kit” or “the template kit”. The kit 100 generally includes a template holder 102 and a plurality of mortise templates 106-113. The mortise templates 106-113 may also be referred to herein as “the template” (when referring to a specific template) or “the templates” (when referring to a plurality of the templates). The kit 100 is illustrated with an optional alignment schedule 115 illustrated schematically in FIG. 1 for locating the various templates 106-113.

Figure 2:
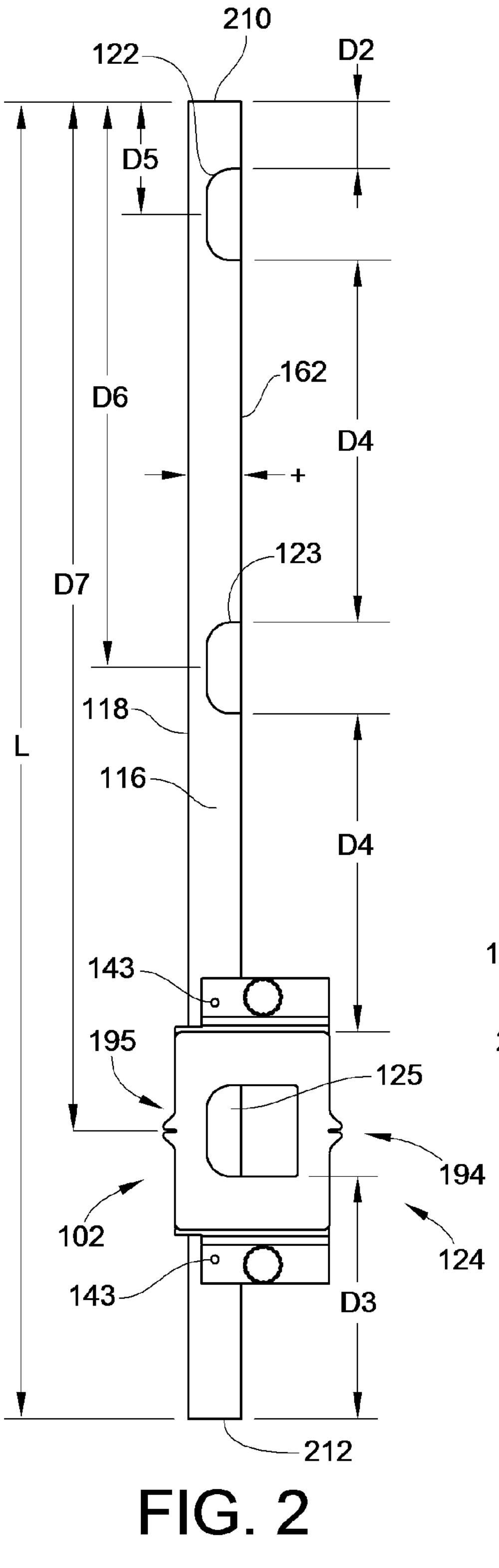
FIG. 2 is a top view illustrating a guide of the mortise template kit of FIG. 1 mounted to an edge of a door.

With additional reference to FIG. 2, the template holder 102 is mounted to a door edge 116 of door 118. The template holder 102 includes template 108 secured thereto to form guide 124, which is used herein to refer to the combination of the template holder 102 and one of templates 106-113. The guide 124 provides a guide for forming and locating a mortise 125 in the door edge 116. The mortise 125 will be similar to the other two mortises 122, 123 previously formed in the door edge 116 using the template holder 102 and template 108.

Typically, the user will use the guide 124 to directly guide a router (not shown) as the mortise 125 is milled into the door edge 116. However, the guide 124 could be used to merely scribe or otherwise mark an outline of the mortise 125 which will be subsequently formed by removal of the door edge 116 by another tool such as a chisel (not shown).

Figure 3:
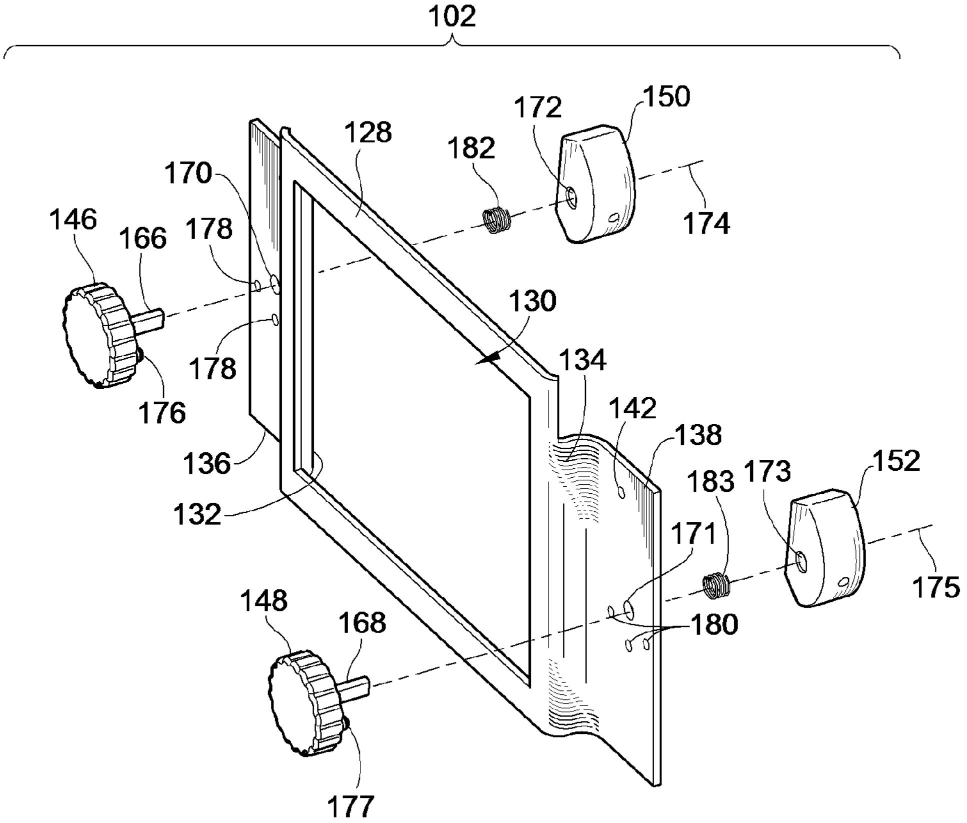
FIG. 3 is an exploded perspective illustration of the template holder of the template kit of FIG. 1.

With reference to FIG. 3, the template holder 102 includes a frame portion 128 that forms a mounting aperture 130 and a pair of leg portions 132, 134 that each terminate into a foot portion 136, 138, respectively. The leg portions 132, 134 are configured to offset the feet 136, 138 from the frame portion 128 in a direction extending generally parallel to the direction at which the mounting aperture 130 extends through the frame portion 128.

The feet 136, 138 include apertures 140, 142 through which a nail 143 (see FIG. 2) or other tacking device passes when the template holder 102 is secured to a door edge 116. The apertures 140, 142 are positioned on opposite sides of the mounting aperture 130 and extend through the template holder 102 generally parallel to the mounting aperture 130.

The template holder 102 is preferably a unitary body formed from a single piece. More preferably, the template holder 102 is preferably a piece of stamped metal. However, the template holder 102 could be formed from plastic materials. Further, the template holder 102 could be formed from multiple pieces.

Adjustment mechanisms, in the form of knobs 146, 148 connected to cams 150, 152, permit the template holder 102 to be easily adjusted for use with doors having varying thicknesses t. The cams 150, 152 rotate with knobs 146, 148 relative to the template holder 102.

Knobs 146, 148 include shafts 166, 168 that pass through shaft apertures 170, 171 passing through feet 136, 138 generally parallel to mounting aperture 130 and connect to cams 150, 152. The shafts 166, 168 insert into the shaft receiving cavities 172, 173. The shafts 166, 168 and shaft receiving slots 172, 173 are non-round and configured such that the shafts 166, 168 do not rotate relative to the cams 150, 152. Shaft apertures 170, 171 generally define axes 174, 175 about which the knob and cam combinations rotate.

Figure 4:
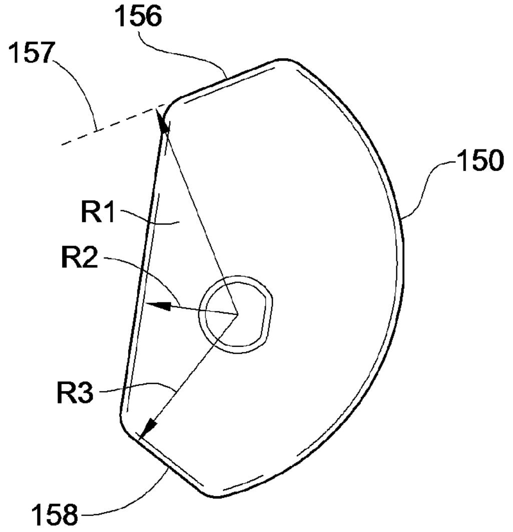
FIG. 4 is a top view of an adjustment cam of the template holder of FIG. 3.
Figure 5:
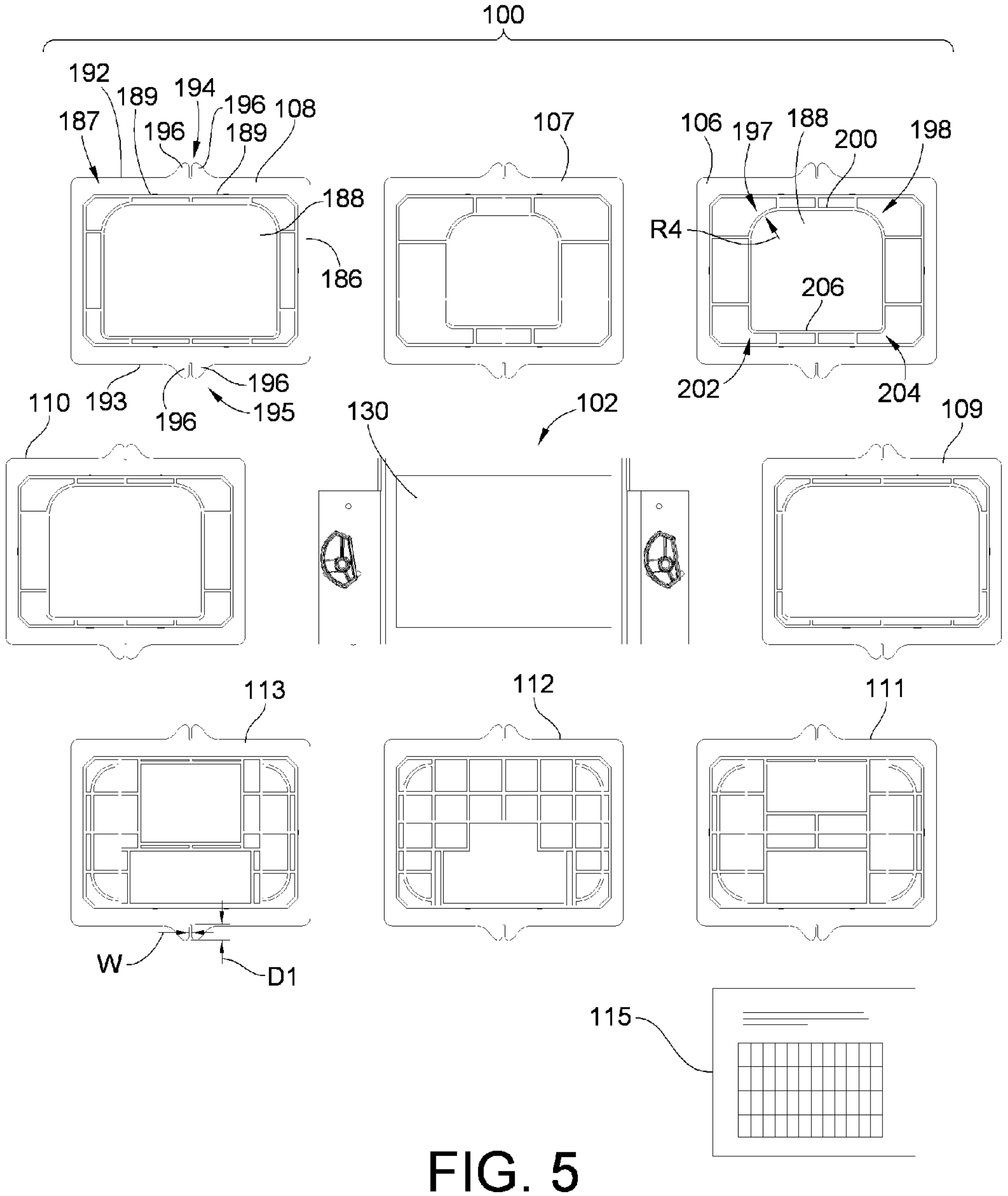
FIG. 5 is a bottom illustration of the template kit of FIG. 1.
Figure 7:
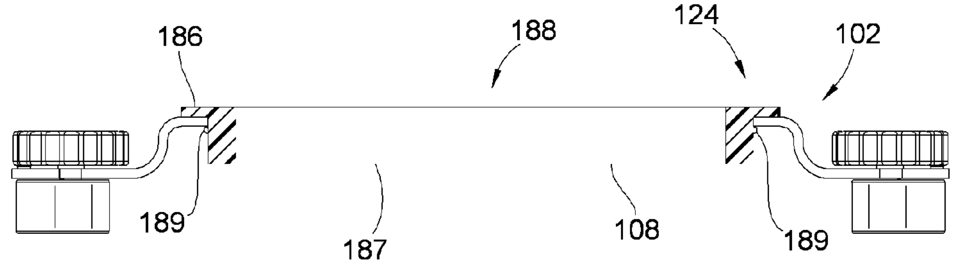
FIG. 7 is a cross-sectional illustration of the guide of the kit of FIG. 1.
Figure 8:
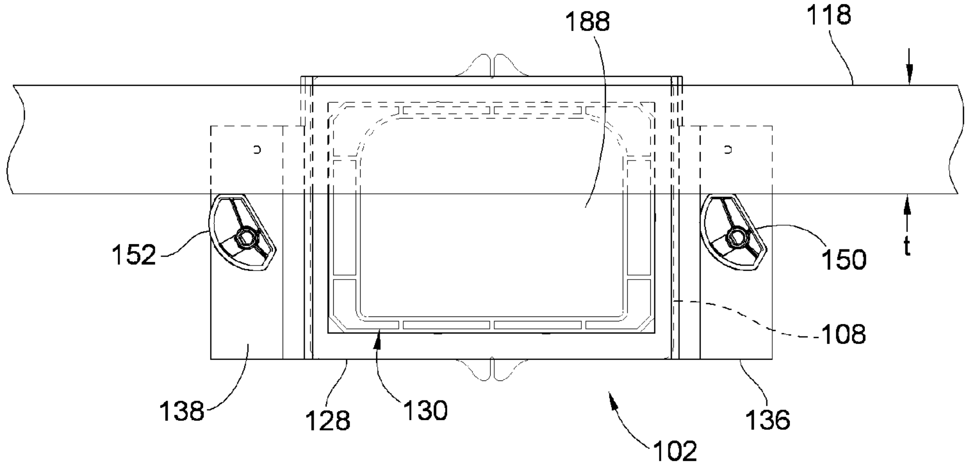
FIG. 8 is a bottom illustration of the guide of the kit of FIG. 1 secured to a door.

The cams 150, 152, as illustrated, are substantially identical. With reference to FIG. 4, which only illustrates cam 150, cam 150 has a non-uniform outer periphery that includes three abutments in the form of generally planar surfaces 156-158. One of the surfaces 156-158 abuts against a door side 162 while the a guide 124 is mounted to a door edge 116 to properly position the template 106-113 of the guide 124 about the thickness t of the door 118. The surface 156-158 that is used to abut the door side 162 of a given door depends on the thickness t of the door 118 or whether a strike plate or latch plate is being installed.

The surfaces 156-158 of cam 150 are spaced varying radial distances R1, R2, R3 (extending generally perpendicularly to the plane defined by the surfaces 156-158) from the axis of rotation of the cam 150. The varying distances R1, R2, R3 allow for adjustment relative to the thickness t of a door 118.

Referring again to FIG. 3, the knobs 146, 148 include projections 176, 177 that insert into locating apertures 178, 180 in the feet 136, 138 to lock the angular orientation of the knobs 146, 148, and consequently cams 150, 152.

The adjustment mechanisms further include coil springs 182, 183 that mount about shafts 166, 168 and bias the cams 150, 152 away from the feet 136, 138 and the knobs 146, 148 toward feet 136, 138. The coil springs 182, 183 retain the projections 176, 177 in a selected one of the locating aperture 178, 180 depending on the desired orientation of the cams 150, 152. The coil springs 182, 183 of the present invention are interposed between the cams 150, 152 and the feet 136, 138. Pulling on the knobs 146, 148 compresses the coil springs 182, 183 and removes the projections 176, 177 from the selected locating aperture 178, 180 such that the knobs 146, 148 can be rotated to alter the orientation of the cams 150, 152.

Other structure can be used to maintain the orientation of the knobs 146, 148 and cams 150, 152 relative to the template holder 102. For example, the projections could extend from the feet and the knobs could include corresponding apertures.

Because hinges, strike plates and latch plates for doors may vary in shape, size or configuration, the templates 106-113 include templates for varying sized and shaped door components. The illustrated templates 106-113 are merely representative templates of an embodiment of kit 100. However, other templates could be included in practicing kits of the present invention. The illustrated kit 100 includes templates for forming mortises for hinges, namely templates 106-110 as well as templates for forming mortises for strike plates or latch plates, namely templates 111-113.

Each template 106-113 generally includes a top plate 186 and a mounting flange 187 extending outward from the top plate 186. A template aperture 188 extending through the top plate 186 that is generally surrounded by the mounting flange 187. The mounting flange 187 is closely sized to the mounting aperture 130 of the template holder 102, such that limited slop is provided between the template holder 102 and an inserted template 106-113. The mounting flange 186 preferably includes outer projecting nibs 189 that extend perpendicular to the template aperture 188 and that are spaced apart from the top plate 186 forming a gap 190 therebetween.

The nibs 189 permit snap-fit engagement between the templates 106-113 and the template holder 102 such that the templates 106-113 can be easily connected to and disconnected from the template holder 102. The frame portion 128 of the template holder 102 is received in the gap 190.

As illustrated, nibs 189 extend outward from all four sides of the mounting flange 187. However, in other embodiments, the mounting flange 187 could be configured with nibs on fewer sides.

The top plate 186 is sized larger than the mounting aperture 130 of the template holder 102 such that a portion of the top plate 186 rests against the frame portion 128 when a template 106-113 is mounted to the template holder 102.

The top plate 186 is generally rectangular-shaped. In the illustrated embodiments, each side 192, 193 of a pair of opposed sides of the top plate 186 of templates 106-113 includes a tab engagement slot 194, 195. The tab engagement slots 194, 195 are configured to be engaged by a tab of a tape measure for assisting in locating the guide 124 along the length of the door 118. In the illustrated embodiments, the tab engagement slots 194, 195 are formed between pairs of outward extending tabs 196. As illustrated, in a preferred embodiment, the tab engagement slots 194, 195 open away from one another and extend entirely through the top plate 186.

The tab engagement slots 194, 195 are preferably between about two hundredths and one-quarter inches and more preferably between two hundredths and fifteen hundredths of an inch in width W and between one-eighth and three-quarter inch in depth D1.

As illustrated, the tab engagement slots 194, 195 are generally positioned at and identify the center of the template aperture 188. As such, an axis aligned with both tab engagement slots 194, 195 of a template 106-113 preferably bisects an individual template aperture 188.

Also, a plurality of the templates, including the hinge templates 106-110, are reversible such that the templates can be used for different types of hinges, strike plates, or latch plates. For example, template 106 is a hinge template and includes a generally rectangular shaped template aperture 188. However, the corners 197, 198 at the opposed ends of side 200 of the template aperture 188 have a larger fillet radius R4 than corners 202, 204 at the opposed ends of side 206. As such, the template 106 can be used in the template holder 102 in a first orientation to provide mortises having larger radius corners (i.e. using corners 196, 198) and a second reversed orientation to provide mortises having small radius corners (i.e. using corners 202, 204). The radius R4 of the large fillet corners 196, 198 is preferably between about three-eighths and three-quarter inch and the radius of the small fillet corners 202, 204 is preferably between about zero inch (i.e. no radius/chamfer) and one-half inch. However, other small and large radiuses are contemplated. To accommodate the varying orientation of the templates, the outer periphery of the mounting flange and the mounting aperture of the template holder are 180 degree rotation symmetric.

The templates 106-113 are preferably made as unitary one piece body. More preferably the templates 106-113 are formed of plastic, and even more preferably from injection molded plastic.

A typical hinged door for entry into a room will have three hinges. Thus, the door will include three mortises in the door edge. As illustrated in FIG. 2, door 118 is configured to have three door hinges and thus includes three mortises 122, 123, 125. Two mortises 122, 123 have already been formed in door edge 116 and the guide 124 is positioned for forming the third mortise 125.

Doors typically come in standard lengths, L, of approximately eighty inches, eight-four inches or ninety-six inches. Further, door hinges are typically placed at standard distances from the ends of the door and from each other. As such, it is typical to place a first mortise 122 mortise proximate the top 210 of the door 118 a distance D2 of approximately seven inches from the top 210 of the door 118 to the first edge of the hinge or mortise 122. A second mortise 125, the mortise for the bottom hinge, will typically be a distance D3 of approximately eleven inches from the bottom 212 of the door 118 measured to the first edge of the hinge or mortise 125. A third mortise 123 is interposed between the top and bottom mortises 122, 125 and typically evenly spaced between the top and bottom mortises 122, 125, illustrated by distances D4.

Kit 100 of the present invention facilitates quick and accurate placement of the mortises 122, 123, 125. More particularly, in an embodiment, the kit 100 includes an alignment schedule 115 (illustrated schematically in FIG. 1). The alignment schedule 115 includes alignment data for placing the guide 124 along the door edge 116 when forming mortises 122, 123, 125. In a preferred embodiment, the alignment schedule 115 includes alignment data that includes the distance from either the door top 210 of the door bottom 212 to a corresponding marking point on the template 106-113 or template holder 102 so that the guide 124 can be quickly and accurately positioned along the door edge 116. These distances are illustrated as D5-D7 in FIG. 2. In one embodiment, the alignment schedule 115 includes alignment data for the three standard door lengths of eighty inches, eighty-four inches, and ninety six inches. The alignment schedule preferably provides the distance for each of the three mortises 122, 123, 125 for all three standard door lengths for hinges ranging from two and a half inches to four and half inches in one-half inch increments.

Figure 6:
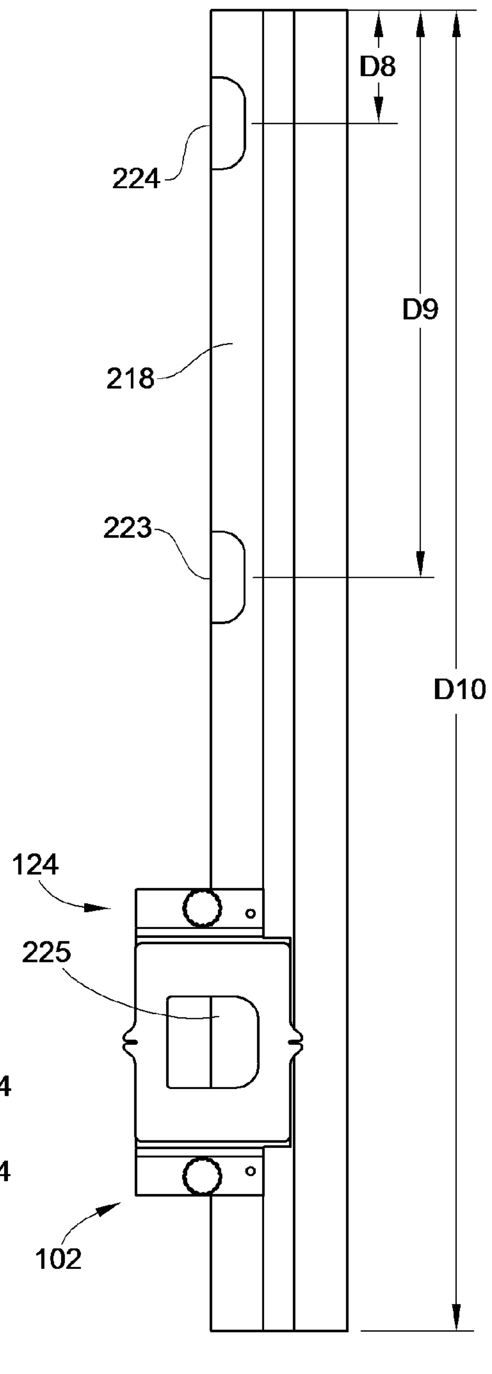
FIG. 6 is a side illustration of a door frame corresponding to the door of FIG. 2 with a guide mounted to the door frame.

With reference to FIG. 6, the guide 124 can be used to form corresponding mortises 224, 223, 225 in a sill of a door frame 218. The alignment schedule 115 may include alignment data for locating these mortises 224, 223, 225 as well. For example, schedule 115 may include distanced D8-D10 which provide alignment data for positioning the guide 124 from the top of the door frame 218.

Table 1 provides an example of an alignment schedule that may be included with a kit 100 according to the teachings of the present invention. The alignment data refers to the distance from the top 210 of the door 118 to the tab engagement slots 194, 195 (i.e. the center of the corresponding template 106-113). Further, the alignment data refers to the distance from the top of the door frame 218 to the tab engagement slots 194, 195. It should be noted that all of the alignment data is in inches. However, other alignment data in other embodiments could be used.

TABLE 1

| 2½ Hinge (Template 107) | | | |
|---|---|---|---|
| | Door Height | | |
| | 80 | 84 | 96 |
| Measurements for Door hinge placement | | | |
| Top (D5) | 8¼ | 8¼ | 8¼ |
| Middle (D6) | 40½ | 42½ | 48½ |
| Bottom (D7) | 66¾ | 70¾ | 82¾ |
| Measurements for Frame/Sill hinge placement | | | |
| Top (D8) | 8⅜ | 8⅜ | 8⅜ |
| Middle (D9) | 40⅝ | 42⅝ | 48⅝ |
| Bottom (D10) | 66⅞ | 70⅞ | 82⅞ |

TABLE 1-continued

| 3 Hinge (Template 106) | | | |
|---|---|---|---|
| | Door Height | | |
| | 80 | 84 | 96 |
| Measurements for Door hinge placement | | | |
| Top (D5) | 8½ | 8½ | 8½ |
| Middle (D6) | 41 | 43 | 49 |
| Bottom (D7) | 67 | 71 | 83 |
| Measurements for Frame/Sill hinge placement | | | |
| Top (D8) | 8⅝ | 8⅝ | 8⅝ |
| Middle (D9) | 41⅛ | 43⅛ | 49⅛ |
| Bottom (D10) | 67⅛ | 71⅛ | 83⅛ |

| 3½ Hinge (Template 110) | | | |
|---|---|---|---|
| | Door Height | | |
| | 80 | 84 | 96 |
| Measurements for Door hinge placement | | | |
| Top (D5) | 8¾ | 8¾ | 8¾ |
| Middle (D6) | 41½ | 43½ | 49½ |
| Bottom (D7) | 67¼ | 71¼ | 83¼ |
| Measurements for Frame/Sill hinge placement | | | |
| Top (D8) | 8⅞ | 8⅞ | 8⅞ |
| Middle (D9) | 41⅝ | 43⅝ | 49⅝ |
| Bottom (D10) | 67⅜ | 71⅜ | 83⅜ |

| 4 Hinge (Template 108) | | | |
|---|---|---|---|
| | Door Height | | |
| | 80 | 84 | 96 |
| Measurements for Door hinge placement | | | |
| Top (D5) | 9 | 9 | 9 |
| Middle (D6) | 42 | 44 | 50 |
| Bottom (D7) | 67½ | 71½ | 83½ |
| Measurements for Frame/Sill hinge placement | | | |
| Top (D8) | 9⅛ | 9⅛ | 9⅛ |
| Middle (D9) | 42⅛ | 44⅛ | 50⅛ |
| Bottom (D10) | 67⅝ | 71⅝ | 83⅝ |

| 4½ Hinge (Template 109) | | | |
|---|---|---|---|
| | Door Height | | |
| | 80 | 84 | 96 |
| Measurements for Door hinge placement | | | |
| Top (D5) | 9¼ | 9¼ | 9¼ |
| Middle (D6) | 42½ | 44½ | 50½ |
| Bottom (D7) | 67¾ | 71¾ | 83¾ |
| Measurements for Frame/Sill hinge placement | | | |
| Top (D8) | 9⅜ | 9⅜ | 9⅜ |
| Middle (D9) | 42⅝ | 44⅝ | 50⅝ |
| Bottom (D10) | 67⅞ | 71⅞ | 83⅞ |

| Strike & Latch Plate Measurements (Templates 111-113) | | | |
|---|---|---|---|
| | Door Height | | |
| | 80 | 84 | 96 |
| From Top of Door | 44 | 48 | 60 |

The following example will illustrate how the alignment schedule 115 and guide 124 is used. The example will best understood with reference to FIGS. 2 and 6. To form the mortises required for an eighty-four inch door using three and one-half inch hinges, the user can measure a distance D5 from the top edge of the door 118 to the tab engaging slot 195 eight and three-quarter inches and form the first mortise 122 at a distance D2 of seven inches from the top of the door. The user would tack the guide 124, including template 110, to the door edge 116 and then route mortise 122. Next, the user would locate guide 124 along the door edge 116 with the tab engagement slot 195 a distance D6 of forty-three and one-half inches from the top of the door 118 and then form the mortise 123. The user would locate guide 124 along the door edge 116 with the tab engagement slot 195 a distance D7 of seventy-one and one-quarter inches from the top of the door 118 and then form the final mortise 125.

Then, the user would do the similar actions on the inside of the door frame 218. The user can measure a distance D8 from the top edge of the door frame 218 to the tab engaging slot 195 eight and seven-eighth inches and form the first mortise 224. The user would tack the guide 124, including template 110, to the door frame 218 and then route mortise 224. Next, the user would locate guide 124 along the door frame 218 with the tab engagement slot 195 a distance D8 of forty-three and five-eighth inches from the top of the door frame 218 and then form the mortise 223. The user would locate guide 124 along the door edge 116 with the tab engagement slot 195 a distance D9 of seventy-one and three-eighth inches from the top of the door frame 218 and then form the final mortise 225.

All references, including publications, patent applications, and patents cited herein are hereby incorporated by reference to the same extent as if each reference were individually and specifically indicated to be incorporated by reference and were set forth in its entirety herein.

The use of the terms “a” and “an” and “the” and similar referents in the context of describing the invention (especially in the context of the following claims) is to be construed to cover both the singular and the plural, unless otherwise indicated herein or clearly contradicted by context. The terms “comprising,” “having,” “including,” and “containing” are to be construed as open-ended terms (i.e., meaning “including, but not limited to,”) unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., “such as”) provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A template kit comprising:

a template holder including a frame and two offsetting legs on opposite ends of the frame, the frame including a mounting aperture interposed between the offsetting legs, the mounting aperture extending generally parallel to a direction of offset provided by the offsetting legs, each leg terminating in a foot portion;

a plurality of templates mountable within the mounting aperture, the templates including a top plate which defines a template aperture extending therethrough, each top plate further including a pair of slots on opposed sides of the template aperture;

wherein each slot is formed between a pair of spaced apart projections; and wherein each top plate is generally rectangular including first, second, third and fourth sides, the first and second sides being parallel to one another, a first pair of projections forming one of the slots extends outward from the first side and a second pair of projections forming the other one of the slots extends outward from the second side.

2. The template kit of claim 1, wherein each pair of projections extending outward from the first and second sides forms a channel having an outward extending mouth, the mouths facing away from one another.

3. The template kit of claim 2, wherein each projection of the pair of projections defines one side of the channel between the mouth and bottom of the channel, opposite the mouth.

4. The template kit of claim 3, wherein each projection extends outward from the corresponding side of the top plate from which the projection extends a distance of between about ⅛ inch and ¾ inch and wherein pairs of projections are spaced apart a width of between about two hundredths and fifteen hundredths of an inch.

5. The template kit of claim 2, wherein the bottoms of the channels generally align with the sides of the template from which the projections extend.

6. A template kit comprising:

a template holder including a frame and two offsetting legs on opposite ends of the frame, the frame including a mounting aperture interposed between the offsetting legs, the mounting aperture extending generally parallel to a direction of offset provided by the offsetting legs, each leg terminating in a foot portion;

a plurality of templates mountable within the mounting aperture, the templates including a top plate which defines a template aperture extending therethrough, each top plate further including a pair of slots on opposed sides of the template aperture; and wherein each slot extends laterally outward beyond a corresponding adjacent side of the frame.

7. The template kit of claim 6, wherein the slots are configured to engage a tab of a tape measure.

8. A template kit of claim 6, wherein an axis aligned with both of the slots bisects the template aperture.

9. The template kit of claim 8, wherein each slot extends entirely through the top plate in the direction extending generally parallel to the direction of offset, and the slot has a width that extends generally perpendicular to the direction of offset between about two hundredths inches and one-quarter inch, the slots having mouths opening in a direction extending generally away from one another.

10. The template kit of claim 9, wherein each slot is formed between a pair of spaced apart projections.

11. The template kit of claim 6, wherein each slot is formed between a pair of spaced apart projections.

12. The template kit of claim 6, wherein each template further includes a mounting flange extending outward from the top plate thereof, the mounting flange extending into mounting aperture when the template is attached to the template holder.

13. The template kit of claim 12, wherein the mounting flange is a generally continuous flange that extends around the template aperture, the template aperture passing through the mounting flange.

14. A template kit comprising:

a template holder including a frame and two offsetting legs on opposite ends of the frame, the frame including a mounting aperture interposed between the offsetting legs, the mounting aperture extending generally parallel to a direction of offset provided by the offsetting legs, each leg terminating in a foot portion;

a plurality of templates mountable within the mounting aperture, the templates including a top plate which defines a template aperture extending therethrough, each top plate further including a pair of slots on opposed sides of the template aperture; and wherein the slots extend through a thickness of the top plate, the slots being bounded on only three sides, such that each slot forms a mouth opening in a direction extending away from the template aperture.

15. A template kit comprising:

a template holder including a frame and two offsetting legs on opposite ends of the frame, the frame including a mounting aperture interposed between the offsetting legs, the mounting aperture extending generally parallel to a direction of offset provided by the offsetting legs, each leg terminating in a foot portion; and a plurality of templates mountable within the mounting aperture, the templates including a top plate which defines a template aperture extending therethrough, each top plate further including a pair of slots on opposed sides of the template aperture;

wherein each template further includes a mounting flange extending outward from the top plate thereof, the mounting flange extending into mounting aperture when the template is attached to the template holder;

wherein the mounting flange is a generally continuous flange that extends around the template aperture, the template aperture passing through the mounting flange; and wherein the mounting flange is recessed laterally inward from the opposed sides and the slots are formed in a portion of the top plate that is laterally outward from the mounting flange.

16. A method of forming at least one mortise using a template kit, the template kit includes a template holder and at least one template, the method comprising:

positioning the template holder and template adjacent a portion of material to be mortised, the template holder includes a frame and two offsetting legs on opposite ends of the frame, the frame including a mounting aperture interposed between the offsetting legs, the mounting aperture extending generally parallel to a direction of offset provided by the offsetting legs, each leg terminating in a foot portion; and at least one template mountable within the mounting aperture, the template including a top plate which defines a template aperture extending therethrough, each top plate further including a pair of slots on opposed sides of the template aperture for engagement with a tab of a tape measure, wherein the slots extend through a thickness of the top plate, the slots being bounded on only three sides, such that each slot forms a mouth opening in a direction extending away from the template aperture;

the step of positioning includes engaging a tab of a tape measure with one of the slots and measuring a desired distance to offset the template from a reference point of the material using the tape measure;

securing the template holder to the material to be mortised; and mortising the material using the template.

17. The method of claim 16, wherein the desired distance to offset the template is measured from the edge of the material to a center of the mortise.

* * * * *